Patented Sept. 2, 1941

2,254,549

UNITED STATES PATENT OFFICE 2,254,549

SINTERED METAL COMPOSITION

Louis Small, Detroit, Mich.

No Drawing. Application November 12, 1938,
Serial No. 240,043

8 Claims. (Cl. 75—22)

The present invention relates to sintered metal compositions and methods of making the same, and more particularly to methods of sintering metals or alloys in powdered form for the purpose of producing relatively coherent masses of predetermined shapes, densities and hardness adapted to suit such masses for varied industrial uses.

In sintering powdered metals or powdered metal alloys it is necessary to avoid oxidation of the constituents of the powdered metal mass insofar as possible. To accomplish this it has been customary in the past to carry out the sintering operations in a closed furnace, usually in the presence of molecular hydrogen. The employment of such a closed furnace has limited the application and use of powdered sintered metals to those fields in which relatively small slugs or blanks of the metal could be used, as such small slugs or blanks were the only commercially feasible forms in which the materials could be produced commercially in such a furnace. This is due to the mechanical restrictions as to the size of the furnaces and to the fact that the molecular hydrogen was effective to prevent oxidation chiefly at the surfaces of the metal slugs or blanks while oxidation frequently occurred to an undesirable extent inside the slug or blank, often resulting in the destruction of the slug or blank during the sintering operation. Oxidation inside the blank during the sintering operation in a hydrogen furnace was controlled by limiting the thickness of the blank and by controlling the time consumed in the sintering operation. However, the use of the time element as a control factor also limits the field of application of powdered metallurgy to such relatively small slugs or blanks, since the heating of the interior of the metal mass is effected by conduction and proceeds more rapidly than does the flow of hydrogen by convection. Thus portions of the metal mass frequently are oxidized by heating such portions of the mass in advance of the time that the hydrogen contacts such portions.

The molecular hydrogen commonly utilized in hydrogen furnaces heretofore used in sintering powdered metals is not so active as nascent hydrogen in reducing the metal oxides which are formed or which tend to be formed on or in the metal composition.

It is, accordingly, an important object of the present invention to form from powdered metals sintered coherent metal compositions which are substantially free of oxidation products, the composition having a controlled density, hardness, size, shape and tensile strength which permits the use of such compositions for numerous industrial purposes.

Another object of the invention is to provide a method of sintering powdered metals or alloy compositions which may be carried out in an open furnace instead of in a closed or hydrogen furnace, the method being capable of sintering the said compositions at such speeds and under such conditions as to minimize the opportunities for oxidation of the constituents of the final sintered mass.

It is a further object of the invention to provide a method of sintering powdered metal compositions in which all interior portions and exterior surfaces of the composition are heated to substantially uniform sintering temperatures in the presence of nascent hydrogen.

A further object of the invention is to provide a method of sintering powdered metal compositions in which the sintering temperatures are reached rapidly and the entire powdered metal mass and holder is uniformly subjected to the desired sintering temperatures.

A further object of the invention is to provide a sintered powdered metal composition which is particularly adapted for use as a matrix in the preparation of abrasive tools or the like and which is capable of firmly bonding or mechanically holding the abrasive substance employed.

A still further object of the invention is to provide a method of sintering powdered metal compositions in which the metals are sintered or worked in a mold, such for example as a steel, cast iron or other ferrous metal or alloy mold, thereby permitting the manufacture of sintered metal compositions for a large number of uses in which the mold may be used as a structural element of the completed article.

Other objects and advantages of this invention will appear in the following description and appended claims. Moreover, it is to be understood that the phraseology or terminology employed herein is for the purpose of description and not of limitation, and it is not intended to limit the invention claimed herein beyond the requirements of the prior art.

In general, the present invention is carried out by admixing, preferably in a ball mill, the powdered metal or alloy constituents of the final composition with a substance which upon heating to the desired sintering temperature is capable of evolving or liberating nascent hydrogen in sufficient quantities and at a sufficient rate over the range of sintering temperatures employed to prevent or substantially retard oxidation of the metals or alloys to be sintered and to chemically reduce any oxides already present.

The powdered metals with which the present invention is particularly concerned are usually mechanical mixtures of separate metal or metallic alloy particles having a relatively high melting point with a metal or metallic alloy having a lower melting point. The "sintering" herein referred to consists in heating the admixed metal powders to temperatures at which the metal having the lower melting point fuses into a coherent mass which surrounds the particles of the other metal and securely bonds such particles into the final coherent product.

The admixed powdered metals and substance capable of liberating nascent hydrogen are then subjected to pressure and compacted at room temperature to form a porous mass in which the separate metal particles are "fritted" together to provide a form-sustaining mass which, however, possesses no appreciable compressive or tensile strengths. Thereafter the compacted mass is heated to sintering temperatures in an open or other type of furnace. During the sintering operation nascent hydrogen is liberated from the mass and oxidation of the metals or alloys during the sintering operation is prevented. Also any oxides present in the metals are reduced. The sintered mass, while still hot, is pressed or forged to form a body which on cooling possesses the desired shape, density and hardness.

The use of a ball mill in a preliminary step of the above operation is desirable as it serves to assist in the control of the grain size of the metal particles and also insures uniform admixture of the metals and the substance which liberates or evolves the nascent hydrogen. Thus all parts of the mass are uniformly exposed to the liberated hydrogen during the sintering operation.

Any substance which is capable of evolving hydrogen in its nascent condition, in sufficient quantity and at a sufficient speed to prevent oxidation of the metals over the range of sintering temperatures employed, may be utilized for the purposes of the present invention. For instance, metal hydrides or organic compounds such as paraffin hydrocarbons may be advantageously employed. Among such materials I have found that the hydrides of the metals of the group consisting of titanium, zirconium, cerium and thorium, i. e., the metals of the left column of the fourth group of Mendelejeff's Periodic Table, particularly the hydrides of titanium and zirconium, are especially suitable for this purpose as they are capable of continuously liberating the desired amounts of nascent hydrogen at the required rates throughout the range of sintering temperatures employed. Titanium hydride, for example, is capable of dissociating at temperatures as low as 300° C., thereby evolving hydrogen, and continues to evolve hydrogen at temperatures as high as required for the usual sintering operation.

In addition to carrying out the sintering in the presence of a material capable of liberating nascent hydrogen, it is desirable to complete the sintering operation as quickly as possible, while at the same time insuring that all parts of the body of the metal mixture as well as its exposed surfaces are uniformly heated to the desired temperatures required to sinter the compositions. To accomplish this I preferably heat the compacted powdered metal mixture in a furnace of the electromagnetic induction type. Such a furnace may be controlled by selection of the frequencies employed so as to provide uniform heat of a predetermined amount in the body of the mass as well as on the surfaces thereof. Thus, the metal mass is uniformly and quickly heated to the desired temperature, in certain instances the sintering action having been completed in twenty seconds, a factor which still further minimizes the possibility of oxidation of the metals.

It should be kept in mind that the porosity of the compacted but unsintered metal mass must permit the escape of the liberated hydrogen in the amounts and at the rate of its liberation and the heat applied for sintering the metals must be controlled to prevent a too rapid liberation of the hydrogen as otherwise the fritted mass may be blown apart before the sintering operation is completed. It is preferable, however, that the duration of the sintering operation be not in excess of about 45 seconds, since the longer periods of time tend to permit oxidation in the mass, particularly if the hydrogen has been completely liberated prior to the completion of the sintering operation.

The temperatures employed during the sintering may be varied in accordance with the kinds of metals used, and the use which is to be made of the sintered mass. Thus, different metals or metal mixtures require different sintering temperatures, and different uses of the final mass require different degrees of coherence and strength therein.

In carrying out the invention as described above, it is essential that the metal mixture to be sintered be sufficiently compact to provide a coherent product, yet sufficiently porous to permit ready escape of entrapped air and any gases formed by reaction of the hydrogen with the air or metal oxides originally present as well as the hydrogen evolved. As the relative porosity of the metal mass is a function of the original particle or grain size of the metal constituents and of the compacting or densifying pressures employed during the cold compacting step, it is seen that both of these factors must be regulated to obtain the desired porosity of the unsintered mass. Thus, the finer the particle size of the metals, the lower should be the pressures employed in compacting the mass prior to sintering. For example, where particles of 150 mesh are utilized, it is undesirable to employ pressures in excess of 70,000 lbs. per sq. in. in compacting the mass at room temperature, while if particles of 250 mesh are used, relatively lower pressures should be employed.

The porosity of the sintered mass is reduced and the mass is compacted to the desired degree by subjecting the material while hot and immediately following the liberation of the gases, to pressures sufficient to reduce the sizes of the pores of the material. During this operation the material may be shaped to the desired sizes and shapes.

The metal compositions which I utilize in carrying out the methods described above are a mechanical admixture of the hydrogen-liberating substances previously referred to, one or more base or foundation metals or alloys and a metal or alloy or mixture of metals or alloys of lower melting point than the base metal and which is capable of acting as a bonding material for the base metal when sintered. Prior to sintering the admixture is in the form of a powder. Examples of suitable base metals are iron, cobalt, nickel, tungsten, vanadium, molybdenum and tantalum. As examples of the bonding metal or alloy I may employ copper or a eutectic mixture of copper and titanium or copper and zirconium. It is to be understood, however, that I may also use as the bonding material any metal or eutectic mixture of the base metal and the metal element of a metal hydride, if used, which metal or eutectic mixture has a melting point below that of the base metal employed in forming the sintered composition. For example, if nickel is the base metal and zirconium hydride is used as the hydrogen-liberating substance, then a eutectic mixture of zirconium and nickel is added to the nickel and the zirconium hydride and functions as the bonding material. It is to be understood, however, that a bonding material may be formed as a eutectic mixture of the base metal and the metal element of the hydride after the hydrogen is liberated, and it is within the scope of the present invention to utilize such mixtures as the bonding material in place of a separately formed eutectic mixture or as an additional bonding material.

The eutectic mixture of copper and titanium above referred to is especially suitable as a bonding material for many purposes of the present invention, as for example when used with tungsten as the base metal, in which instance it increases the hardness and density of the final product over the hardness and density of the product when copper alone is used as the bonding material. Also, such a eutectic mixture does not oxidize as readily as does pure copper. Further, the above copper-titanium eutectic mixture has a melting point of approximately 878° C. which is lower than the melting point of either copper or titanium alone, copper melting at approximately 1083° C. while titanium melts at approximately 1800° C.

As another example of a eutectic mixture which may be used as the bonding material in forming a composition having nickel as a base metal by the use of zirconium hydride, I may employ a mixture consisting of approximately 87% copper and approximately 13% zirconium which melts at approximately 966° C.

The use of such eutectic metal mixtures as the bonding material is desirable either with or without the use of the hydrogen-liberating material as it results in a lowering of the temperatures required for sintering the entire metal mixture.

I have found that a composition containing about 60% to 90% of base metal, about 35% to 1% of a bonding metal such as the eutectic mixtures above referred to, about 35% to 5% of a metal hydride, and the balance a metal capable of forming a eutectic mixture with the metal radical of the hydride after liberation of the hydrogen, is desirable for the purposes of this invention.

As one example of a composition adapted particularly for the preparation of matrices for abrasive materials, such for example as diamond particles or chips, in accordance with the present invention, I have employed:

| | Per cent, approx. |
|---|---|
| Iron | 70 |
| Copper | 9 |
| Copper-titanium eutectic | 9 |
| Titanium hydride | 9 |
| Carbon | 3 |

The iron, copper, copper-titanium eutectic, titanium hydride and the carbon in the form of finely divided powders are placed in a ball mill and mixed for approximately 4 hours. The average particle size is 150 mesh. This material is compacted at room temperatures in a steel mold at pressures of approximately 60,000 lbs. per sq. in. The mass is then heated to sintering temperatures of approximately 1287° C. for approximately 25 seconds. The furnace used was of the electromagnetic induction type and was operated at approximately 40,000 cycles per second and approximately 4600 volts and approximately .77 ampere. Upon completion of the sintering operation the mass while hot is compacted at pressures of approximately 10,000 lbs. per sq. in. The resulting product has a Brinell hardness of approximately 495 and a Rockwell hardness of approximately 50 (C scale).

In place of the titanium hydride in the above example I may use a hydrocarbon of the paraffin series which is capable of liberating nascent hydrogen at the sintering temperatures.

As another example of the use of the present invention in forming a sintered metal composition, I have used nickel in powder form as the base metal in amounts ranging from approximately 93% to approximately 59% and admixed this with a powdered eutectic mixture of zirconium and nickel in amounts ranging from approximately 1% to approximately 41% and with approximately 6% to 40% of powdered zirconium hydride. The eutectic mixture of zirconium and nickel insofar as it is now possible to determine consisted of a zirconium and nickel alloy comprising approximately 80% to 88% nickel and approximately 12% to 20% zirconium.

In accordance with the above example I have formed a metal composition of the following materials in the following amounts:

| | Per cent, approx. |
|---|---|
| Nickel | 49.2 |
| Zirconium-nickel eutectic | 38.4 |
| Zirconium hydride | 9.8 |
| Carbon | 2.6 |

The materials in the above proportions were admixed in a ball mill for approximately 4 hours. The average particle size was 150 mesh. The material was compacted at room temperatures in a steel mold at pressures of approximately 60,000 lbs. per sq. in. The mass was then heated to sintering temperatures of approximately 1260° C. for a period of approximately 25 seconds. The furnace used was of the electromagnetic induction type and was operated at approximately 4600 volts, approximately .77 ampere and approximately 40,000 cycles per second. Upon completion of the sintering operation, the mass was compacted while hot by pressures of approximately 10,000 lbs. per sq. in. The mass was found to have a Brinell hardness of approximately 555 and a Rockwell hardness of approximately 55 (C scale).

In the above examples and in all places herein where reference is made to percentages or parts of materials such percentages or parts are by weight of the total mass in each instance.

It is to be understood that other of the materials previously mentioned may be substituted for the above materials and that the above percentages of materials may be varied within the limits above mentioned without impairing the properties of coherence or the control of the density and hardness inherent in the above composition when treated as above described. Further, the percentage of the hydrogen-liberating material such as the hydride may be reduced if steps are taken to protect the metals from oxidizing influences, such as by utilizing a hydrogen furnace in the sintering operation.

In utilizing the present invention other control factors which must be considered are:

(1) The grain size of the metal particles after the ball milling operation is completed and just prior to compacting the mass.

(2) The amount and kinds of metallic oxides, if any, are present in the mass prior to sintering.

(3) The pressures employed in cold compacting of the powdered mixture.

(4) The quantity and kind of hydrogen-liberating material employed.

(5) The duration of time and the temperatures used in the heating step.

(6) The amount and rate of liberation of the hydrogen over the heating range employed.

(7) The melting point of the bonding metal.

(8) The pressures employed while compacting the mass in its heated condition.

(9) The rate and method of quenching or cooling the mass after the hot pressing step.

(10) If the sintering is carried out in a furnace of the electromagnetic induction type, the amperage, voltage and frequencies employed are selected to produce the desired amount of heat within the body of the compacted mass.

Any one or all of these factors may be varied to obtain sintered products of different characteristics. The limiting factors are that when the mass is compacted and placed in the heating furnace, it should be sufficiently porous to permit the escape of the evolved gases at such a rate as to prevent any explosion of the gas or any breaking apart of the compacted but unsintered mass. After the mass is sintered and while hot, the density of the mass is increased by the hot pressing operation which is controlled to produce the desired density in the mass when cooled.

The sintering methods described herein result in products which not only have the desired characteristic of coherence combined with a controlled density and hardness, but are substantially non-oxidized. Further, my methods do not require the use of a hydrogen or other form of closed furnace, although they may, if desired, be employed in connection with the use of such a furnace. By thoroughly admixing the hydrogen-liberating substance with the metal or alloy to be sintered, it is possible to obtain uniform protection or treatment of all portions of the metal, and by selecting a suitable eutectic mixture of the bonding metal the sintering temperatures are lowered. Further, the use of an electromagnetic induction furnace for heating the mass is desirable in that the product is uniformly and quickly heated to sintering temperatures throughout.

The sintered compositions I have described are capable of varied application in the arts, such for example as matrices for the reception or support of abrasive substances such as diamonds, either in power or chip form, emery, carborundum, tungsten carbide, tantalum carbide, or the like. When applied for such purposes it is seen that the nascent hydrogen employed cleans the metal surfaces, thus permitting a more complete bonding of the metals. When using such abrasive materials it is desirable to add carbon in an amount of approximately 1% to 5% in excess of the amount required to saturate the base metal. This satisfies the avidity of the base metal for carbon and prevents the base metal from robbing the abrasive substance of its carbon. The process also prevents oxidation of the diamond or other abrasive material during the sintering of the mass. Moreover, the uniform heating of the metal mixture tends to relieve any stresses therein which might occur in the presence of sharp temperature gradients which might fracture the mass and weaken its grip or hold on the diamond or other abrasive particles.

It should also be observed that the metal compositions described herein mechanically retain the abrasive substance such as diamond chips or particles and do not require a wetting of the surface of the abrasive particles to provide a bond therefor. It is, therefore, possible to remove the abrasive substance, such for example as the diamonds, from the tool or from the matrix without splitting or cracking the substance. This is a factor of importance, particularly in the use of the invention to form matrices for diamonds in cutting tools since it is possible to reset or replace the diamonds in the tool when necessary or desirable. Further, since the base metals used in my compositions do not melt at the sintering temperatures employed, there is no tendency for the mass to retract as a result of capillary action from the surface of the abrasive material. Also, abrading tools made from abrasives and sintered matrix compositions such as described herein are not limited in size by the use of a hydrogen furnace, or by the use of the press, as the press is independent of the heating coil or other heating means.

Since steel molds may be used in the preparation of my products, in view of the relatively low sintering temperatures employed, it is possible to make steel jacketed bearings therefrom, pumps, or such articles as reinforcing or wear-resisting steel inserts for welding electrodes, or the like, or a wear-resisting layer of metal can be applied to form an integral part of any otherwise unwieldly casting. Thus, the metal compositions described herein are adapted for numerous applications which will occur to those skilled in the art.

The use of the substance capable of liberating or evolving nascent hydrogen and sintering the powdered metals or alloys in an open furnace may also be used in connection with the manufacture of the so-called "hard metal" compositions such, for example, as sintered tungsten carbide, tantalum carbide or the like and in which the hard and refractory metal alloy particles are used as the base metal and are sintered in the presence of a more fusible metal such for example as iron, nickel, cobalt or the like. When so used, the powdered hard metal alloys and the fusible metal are treated as above set forth and are sintered and pressed to any desired form. By using a tool shank formed of a material having a higher melting point than that of the fusible metal, the present method, if desired, permits the formation of the sintered "hard metal" mass directly in the shank of such a tool. This method would eliminate the conventional "brazing" operation previously required to secure such hard metal composition to the body of the tool. If the tool shank has a lower melting point than that of the fusible metal, the sintered hard metal composition is formed as above and thereafter is secured as by brazing to the tool shank. By the use of the hydrogen evolving material as above set forth, in the brazing compound, this operation may also be carried out in an open furnace.

I claim:

1. The method of forming a coherent metal mass which comprises admixing a powdered base metal, a powdered metal hydride, and a powdered eutectic mixture of a bonding metal and a metal comprising the metal radical of said metal hydride, said eutectic mixture having a melting point below the melting point of the base metal and adapted to form a coherent bonding metal for the particles of said base metal, to form a powdered mass, compacting said mass and thereafter heating the mass to sintering temperatures whereby nascent hydrogen is liberated by the decomposition of the said metal hydride and said bonding metal is fused to form a coherent mass.

2. The method of forming a coherent metal mass which comprises admixing a powdered base metal, a powdered metal hydride, and a powdered eutectic mixture of a bonding metal and a metal comprising the metal radical of said metal hydride, said eutectic mixture having a melting point below the melting point of the base metal and adapted to form a coherent bonding metal for the particles of said base metal, to form a powdered mass, compacting said mass and thereafter heating the mass to sintering temperatures whereby nascent hydrogen is liberated by the decomposition of the said metal hydride and said bonding metal is fused to form a coherent mass, and thereafter compacting the mass while hot to form a mass of a desired density.

3. A powdered metal composition capable of being transformed into a sintered coherent metal mass at relatively low temperatures which comprises a ferrous base metal, a bonding metal comprising a eutectic mixture of copper and titanium, and a metal hydride capable of emitting nascent hydrogen over the range of sintering temperatures employed.

4. A powdered metal composition capable of being transformed into a sintered coherent metal mass at relatively low temperatures which comprises a base metal selected from the group consisting of iron, cobalt, nickel, tungsten, vanadium, molybdenum and tantalum; a bonding metal selected from the group consisting of a eutectic mixture of copper and titanium and a eutectic mixture of copper and zirconium; and a metal hydride capable of emitting nascent hydrogen over the range of sintering temperatures employed.

5. A powdered metal composition capable of being transformed into a sintered coherent metal mass at relatively low temperatures which comprises

| | Per cent, approx. |
|---|---|
| Iron | 70 |
| Copper | 9 |
| Copper-titanium eutectic | 9 |
| Titanium hydride | 9 |
| Carbon | 3 |

6. A powdered metal composition capable of being transformed into a sintered coherent metal mass at relatively low temperatures which comprises

| | Per cent, approx. |
|---|---|
| Nickel | 49.2 |
| Zirconium-nickel eutectic | 38.4 |
| Zirconium hydride | 9.8 |
| Carbon | 2.6 |

7. The method of forming a coherent metal mass which comprises mixing a powdered ferrous base metal, a powdered bonding metal comprising a eutectic mixture of copper and titanium, a powdered metal hydride, compacting the resulting powdered mass, and thereafter heating the mass to sintering temperatures whereby nascent hydrogen is liberated by the decomposition of said metal hydride and said eutectic mixture is fused to form a coherent mass.

8. The method of forming a coherent metal mass which comprises mixing a powdered base metal selected from the group consisting of iron, cobalt, nickel, tungsten, vanadium, molybdenum, and tantalum; a powdered bonding metal selected from the group consisting of a eutectic mixture of copper and titanium and a eutectic mixture of copper and zirconium, and a powdered metal hydride; compacting the resulting powdered mass; and thereafter heating the mass to sintering temperatures whereby nascent hydrogen is liberated by the decomposition of said metal hydride and said eutectic mixture is fused to form a coherent mass.

LOUIS SMALL.